United States Patent [19]

Wei et al.

[11] Patent Number: 4,946,808

[45] Date of Patent: Aug. 7, 1990

[54] METHOD FOR PREPARING DENSE, PRESSURELESS SINTERED SIC WHISKER REINFORCED COMPOSITE CERAMICS

[75] Inventors: Wen-Cheng Wei, Jamaica Plain; Bruce E. Novich, Lexington, both of Mass.

[73] Assignee: Ceramics Process Systems Corporation, Milford, Mass.

[21] Appl. No.: 269,671

[22] Filed: Nov. 10, 1988

[51] Int. Cl.$^5$ .............................................. C04B 35/80
[52] U.S. Cl. ........................................ 501/95; 264/56; 264/63
[58] Field of Search ................... 264/29.1, 56, 63, 65, 264/302, 328.1 B; 501/94, 95

[56] References Cited

U.S. PATENT DOCUMENTS

| | | | |
|---|---|---|---|
| 3,962,162 | 6/1976 | Schurack | 501/153 |
| 4,221,697 | 9/1980 | Osborn et al. | 260/42.53 |
| 4,295,890 | 10/1981 | Stroke | 501/91 |
| 4,388,255 | 6/1983 | Simpson | 264/332 |
| 4,578,233 | 3/1986 | Huseby et al. | 501/98 |
| 4,587,068 | 5/1986 | Borase et al. | 264/63 |
| 4,636,480 | 1/1987 | Hillig | 501/88 |
| 4,800,180 | 1/1989 | McAllister et al. | 501/95 |
| 4,810,442 | 3/1989 | Hillig et al. | 264/86 |
| 4,816,182 | 3/1989 | Novick et al. | 264/63 |
| 4,829,027 | 5/1989 | Cutler et al. | 501/89 |

OTHER PUBLICATIONS

Milewski, J., "Efficient Use of Whiskers in the Reinforcement of Ceramics" *Advanced Ceramic Materials*, vol. 1, No. 1, 1986, pp. 36-41.

*Primary Examiner*—Brian E. Hearn
*Assistant Examiner*—Andrew Griffis
*Attorney, Agent, or Firm*—Bradley N. Ruben

[57] ABSTRACT

Whisker reinforced composites having improved strength and toughness are prepared by a process including densification by essentially pressureless sintering. There is no need to hot press or hot isostatic press to achieve a density of 99+% of theoretical for 10 vol. % whiskers and 93+% for 20 vol. % whiskers. The composites are derived from the desired volume fraction of whiskers, a sintering aid preferably submicron in average size range, and a major portion of a pressureless sinterable matrix material having an average particle size of not more than about 0.5 micron. Yttria-alumina composites are sintered at less than about 1800° C. and for less than about two hours to avoid surface degradation.

20 Claims, 4 Drawing Sheets

METHOD FOR PREPARING DENSE, PRESSURELESS SINTERED SiC WHISKER REINFORCED COMPOSITE CERAMICS

BACKGROUND OF THE INVENTION

1. Field of the Invention.

The present invention relates to formulating a whisker containing body that can be pressureless sintered to full density in one sintering step or that can be pressureless sintered to closed porosity in preparation for hot isostatic pressing. Generally, this invention pertains to any non-sinterable whisker which is contained in a pressureless-sinterable or sinter-HIP'able and chemically compatible matrix.

2. The State of the Art.

Whiskers are single crystal, high aspect ratio particles which typically have tensile strengths of about 7 GPa and elastic modulus of about 700 GPa.

Sintered silicon carbide whisker reinforced ceramic oxide composites are a relatively new class of engineering materials which have particular applications at high temperatures. The reinforcing whiskers are believed to act as crack blunters and absorb fracture energy, which imparts higher fracture toughness to the brittle ceramic matrix. An analysis of toughening mechanisms, including the possible effect of crack deflection and whisker bridging/pullout, is discussed by J. Homeny et al., in "Processing and Mechanical Properties of SiC-Whisker-Al$_2$O$_3$-Matrix Composites," *Amer. Cer. Soc. Bull.*, vol. 66, no. 2, pp. 333–338 (1987). Exemplary of the possible application benefits, Tiegs and Becher (*J. Amer. Cer. Soc.*, vol. 2, p. 339 (1986)) have shown that the presence of even low (i.e., <10 vol. %) SiC whisker contents improves various properties, including thermal shock resistance, toughness, and high temperature strength. Thus, proper engineering of these materials should allow the structural ceramic component designer to achieve key property improvements.

The variables which influence the sinterability of a ceramic powder compact can be separated into two groups: powder characteristics and arrangement characteristics. Powder characteristics include particle size (both average and the distribution of particle sizes), particle shape (e.g., sphericity, aspect ratio), surface chemistry (e.g., isoelectric point), and the overall powder composition (e.g., mixtures of different particles). Arrangement characteristics are dependent upon the powder characteristics and the dynamics of particle ordering during processing, forming, and consolidation; arrangement characteristics include green density, green density distribution, pore size, and pore size distribution.

Fabrication of ceramic-whisker composites has not been straightforward; elaborate schemes have been devised to attain full density of the composite matrix upon sintering. Whiskers, which are non-sinterable and inert, act as proppants which retard the densification of the matrix particles. Traditionally, hot pressing or sinter-HIP with sintering aids have been used to densify these composites. Hot Pressing (HP) involves uniaxially pressing a green ceramic compact under high temperature and pressure; this process is limited to simple shapes that can be uniaxially formed, such as disks and billets. The green ceramic compacts can have open porosity prior to sintering, and the compacts can have up to 50% total porosity. The Hot Isostatic Pressing (HIP) process is where a green compact is formed, of either a simple or a complex shape, and the compact is subsequently sintered in an isostatic stressfield at high temperature and pressure (e.g., <20,000 psi). In this case, all of the porosity present in the green compact must be sealed off at the surface, i.e., all of the porosity must be "closed"; this can be accomplished either by first sintering the piece to closed porosity, typically ≦10 vol. % porosity, or by encapsulating the compact in glass prior to HIP'ing. The technique generally preferred in the art is the sinter-HIP densification scheme, in which one must have the ability to pressureless sinter the ceramic to a density of approximately ≧90–92% of theoretical density to effectively close the porosity. Further, because the second step (pressure sintering, HP, or HIP) can cause ceramic degradation at the expense of densification, and HP or HIP is a costly batch step requiring expensive process equipment and very careful sample preparation, the achievement of pressureless sintered densities approaching theoretical density for high whisker loadings would be very beneficial. Still further, pressure sintering typically results in an overfired ceramic matrix, often leading to degradation and formation of a glassy phase at the expense of full densification; accordingly, providing pressureless sintered samples of a high density would help to reduce the degradation caused in the pressure sintering step. Also, a typical hot pressed SiC whisker/alumina composite at full density will exhibit alumina grains in excess of 50 microns, an order of magnitude larger than the original alumina particles, thereby resulting in strength limiting defects in the stressed body.

As a reinforcing component in the sintered ceramic matrix, Wei (U.S. Pat. No. 4,543,345) has shown that pressure sintered composites of silicon carbide whiskers and a fine ceramic powder (such as alumina, mullite, or boron carbide) provide a significant fracture toughening component to the brittle ceramic microstructure. Wei prepares the composites by sintering at 1600° C. to 1950° C. at pressures of 28 to 70 MPa.

Tiegs (U.S. Pat. No. 4,652,413) augmented Wei's composition by the addition of 0.5 to 5 wt. % of a sintering aid such as yttria to a body containing 5 to 10 vol. % silicon carbide whiskers, and the balance being 0.1 to 1.0 micron alumina. Tiegs begins with a granulated mixture of alumina, whiskers, and sintering aid, which is cold pressed into a pellet having a density of approximately 55% theoretical. The pellet is then two-step sintered to full density by first pressureless sintered at 1800° C. to 95% of theoretical density, followed by a pressure sintering step at 20,000 psi to over 98% of theoretical density. Tiegs also states that pellets with 20 vol. % whiskers could not be sintered to over 75% theoretical density, although increased yttria content may be beneficial. Moreover, Tiegs also states that pellets with whisker concentrations exceeding 10 vol. % may not be sinterable without pressure assistance.

Becher and Tiegs (in U.S. Pat. No. 4,657,877) also built upon Wei's work by the addition of transformation toughened tetragonal zirconia to the SiC whisker-mullite and SiC whisker-alumina matrix. The further addition of ZrO$_2$ to the whisker composite and sintering at 7 to 70 MPa in an inert atmosphere provided further increased toughness.

Thus, the art has continuously resorted to fabrication methods for whisker reinforced composites which require a pressure sintering step. The art has also suggested, in certain aspects, that pressure sintering and/or an increased amount of sintering aid is necessary for compositions having greater than a threshold volume fraction of whiskers. However, the use of a pressure sintering step can limit the complexity and geometry of the composite articles fabricated, as well as adding significantly to the processing costs due to the complexity of the articles.

It is also important to note that SiC whiskers commercially available vary dramatically in their properties. Tiegs and Becher (ORNL/TM-9947, 1985-86) reviewed SiC whisker reinforced ceramic composites, and thereby discovered significant differences among whiskers. Among various whiskers (i.e., those available from ARCO, Tokai Carbon, Tateho, Versar, and Los Alamos National Laboratory) incorporated at 20 vol. % into an alumina matrix, sintered densities ranged from 3.72 to 3.83 g/cm$^3$, strengths varied from 340 to 650 MPa, fracture toughnesses varied from 4.2 to 9.1 MPa $\sqrt{m}$, and weight losses during hot pressing varied from 0.8% to 5.17%. In some instances (with Tateho and Tokai Carbon whiskers), while the whiskers appeared to be intact, SEM examination of a fracture surface revealed no SiC whiskers, believed to be due to adhesive interaction between the matrix and whisker phases, and thus no benefits of pullout or crack deflection. Tiegs, Becher, and Harris (ORNL/TM-9947, 1984-85) have also shown that for 20 vol. % SiC reinforced alumina including Tateho and ARCO whiskers, the respective fracture toughnesses were 5.1 and 7.8, and the respective flexural strengths were 535 and 700. The 1984-85 report also showed the good thermal shock resistance of 20 vol. % SiC-alumina composites up to about 900° C. Thus, SiC whiskers can provide desired properties, but the properties vary widely among whiskers, which thereby limits the number of variables for which a certain ceramic can be engineered. See also T. Tiegs, "Business Outlook for Advanced Ceramics and Composites," *Whisker-Reinforced Ceramic Composites: Present Status and Potential Trends*, presentation at Oak Ridge National Laboratory on Mar. 12, 1987.

As noted above, pressuring sintering processes typically degrade the surface layer of the oxide ceramic matrix, usually by oxidizing the same, often necessitating machining of the surfaces prior to use. Accordingly, it would be beneficial to decrease or eliminate this degradation and the subsequent machining; generally, it would be necessary to modify the matrix such that it sinters faster and at a lower temperature to achieve such benefits.

SUMMARY OF THE INVENTION

In view of the foregoing, it would be beneficial to provide a pressureless sintered, whisker reinforced body of at least 5 vol. % reinforcing whiskers fabricated in a single sintering step to near theoretical density or at least to a closed porosity; that is, it would be beneficial to achieve such densities while eliminating the pressure sintering step from the prior art processes. It would also be advantageous to provide a whisker reinforced body having about 15 vol. % whiskers, no open porosity, and a density of at least about 93% of theoretical, and fabricated without the employ of a pressure sintering step; likewise, it would be advantageous to provide a body having 10 vol. % whiskers and pressureless sintered to near theoretical density (>99%). It would also be valuable and constructive to indentify and manipulate powder and whisker characteristics such that their arrangement characteristics provide green compacts of a high and uniform density.

A single-step, pressureless sintering process would offer many cost advantages over sinter-HIP, HIP, and HP processing methods; as noted above, such processes require expensive equipment and are limited in the geometries of the bodies produced. The ability to at least sinter-HIP at high whiskers loadings has several cost and process advantages over solely HIP or HP processing; and the ability to pressureless sinter to high density minimizes or avoids the surface degration typically found in the HIP process.

It would also be beneficial to provide whisker reinforced bodies which are sintered at lower temperatures, whereby performance characteristics of the body are enhanced due to an improved microstructure, and by solely pressureless sintering the amount of HIP'ing required is reduced to the extent that the surface degradation it cause is thereby also reduced.

Towards achieving these and other benefits, the present invention provides a process for producing a whisker reinforced composite ceramic including the steps of (i) providing a slip composed of ultrafine sinterable oxide matrix particles, a sintering aid, and whiskers, (ii) casting or molding the slip into the desired shape, and (iii) sintering to full density in one pressureless sintering operation at a temperature greater than the eutectic temperature of the sintering aid and matrix material.

A body produced by the process is also provided by this invention, which body has a microstructure containing well-bonded submicron grains (i.e., $\leq 1.2$ microns) and an as-fired surface finish sufficient to obviate the need for subsequent machining. More particularly, this invention provides a ceramic composite densified essentially by pressureless sintering formed from a mixture consisting essentially of 5 to 10 vol. % whiskers, 2-10 vol. % of a sintering aid, and a pressureless sinterable matrix material having an average particle size of $\leq 0.5$ micron, the composite having a density of at least 99% of theoretical, and 93+% T.D. for up to 20 vol. % whiskers.

Accordingly, various features of this invention include: providing a pressureless-sintered compact at various solids loadings of a sufficiently high density to effectively close the porosity for subsequent HIP'ing operations; providing a matrix material that sinters quickly at lower temperatures, whereby surface degradation during HIP'ing is reduced and the resulting article requires significantly less surface machining prior to use; and the ability to avoid or reduce machining eliminates the need to handle the fines by-product from machining, reduces costs by eliminating a processing step, and also avoids the introduction of defects into the ceramic by the machining operation.

DETAILED DESCRIPTION OF SPECIFIC EMBODIMENTS

Figure 1:
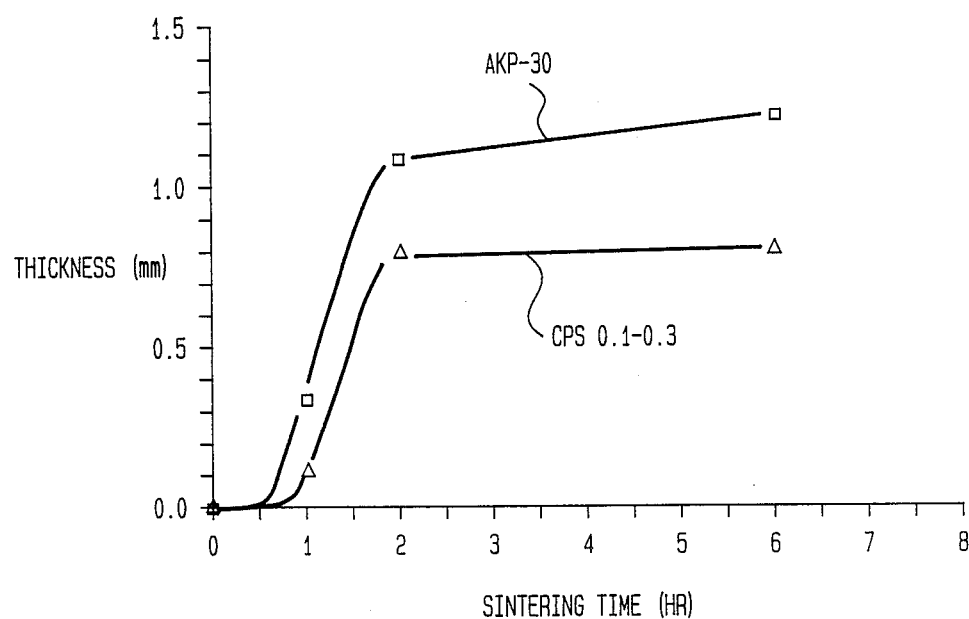
FIG. 1 depicts the degradation kinetics of a 10 vol. % WRA (whisker reinforced alumina) article sintered at 1770° C.

As generally described above, the present invention is directed to fabricating whisker reinforced single or multiphase ceramic matrix composites. In accordance with the present process, a whisker-ceramic particulate mixture is provided in accordance with co-pending U.S. patent application Ser. No. 036,377, filed Apr. 9, 1987, incorporated by reference herein. That application describes the preparation of a highly loaded slurry of matrix phase (in accordance with co-pending U.S. patent application Ser. No. 856,803, now U.S. Pat. No. 4,816,182, filed Apr. 25, 1986, incorporated herein by reference), to which is added a dopant phase; in the present invention, the dopant phase is composed of whiskers. The process described in the U.S. patent application Ser. No. 036,377 application provides highly loaded (e.g., >55 vol. % total solids, including both the matrix component and the dopant component) yet pourable slurries (e.g., viscosities of less than about 1000 cP at 100 s$^{-1}$). (All measured values described herein, such as volume and weight fractions, viscosities, particle and grain sizes, and the like, are to be construed as approximate values).

The matrix phase can be virtually any ceramic material that is pressureless sinterable, such as, but not limited to, alumina, mullite, zirconia, silicon nitride, aluminum nitride, and the like, and mixtures thereof. The starting material for the matrix phase is a powder having a mean particle size of not more than about 0.5 micron. Such powders can be provided by centrifuging commercially available powders, the centrifugation method preferably as described in co-pending U.S. Pat. No. 4,781,671, incorporated herein by reference. The powders preferably have a narrow size range distribution, and preferably have a specific surface area (B.E.T.) of greater than 9 m$^2$/g. Suitable alumina powders are available from the present assignee under the designation CPS-1 ($d_{avg}$ of 0.1–0.3 micron), from Sumitomo Chemical America Corp., New York, NY, under the designation AKP-30 ($d_{avg}$ of 0.3–0.5 micron), and from the Aluminum Co. of America, Pittsburgh, PA, under the designation A16SG, which is preferably classified by centrifugation as described in the '671 patent.

The matrix phase also includes a liquid phase promoting sintering aid in an amount of 2 vol. % to 15 vol. %, although other amounts may be used to the extent the amount of the sintering aid present is effective to promote the formation of a liquid phase and to aid in achieving a ceramic having a density of at least 99% T.D. (as percent of "Theoretical Density") for 10 vol. % whiskers and at least 93% T.D. for 20 vol. % whiskers. Exemplary sintering aids include yttria, lanthana, ceria, magnesia, and the like as readily determinable by an artisan of ordinary skill in the art depending upon the composition of the sinterable matrix, and mixtures thereof. The sintering aid is present as a powder generally having particles in the size range of between 0.1 and 1.2 microns. Additionally, the sintering can be classified to provide the desired average particle size and/or distribution.

The dopant component is composed of 5 vol. % to 30 vol. % of whiskers; fibers are polycrystalline whereas whiskers are single crystals. The whiskers generally have an as-received aspect ratio (length:diameter) of between 10 and 50; generally, the whiskers will have a length of greater than 6 microns. The aspect ratio is preferably adjusted, such as by grinding, to between 5 and 20. The whiskers can be of any matrix-compatible composition (i.e., chemically compatible in the slurry as well as during sintering), such as, but not limited to, tungsten carbide, silicon carbide, silicon nitride, alumina, silica, and the like, and mixtures thereof. Suitable whiskers, in addition to those discussed above, include those available from Tateho (distributed by ICP Group, New York, NY) under the designations SCW #1-0.6S and SCW #1-S105, from American Matrix, Knoxville, TN, under the designation AM6-16, and from ARCO Chem. Co., Greer, SC, under the designation SILAR SC-9. Preferably, as-received whiskers are classified to provide those with the desired length and aspect ratio and to eliminate branched whiskers and non-whisker material.

As described in the aforementioned U.S. patent application Ser. No. 036,377, whiskers are both chemically and geometrically diverse to the particulate matrix phase, which magnifies problems of producing highly loaded (i.e., non-dilute) systems. To provide a well-dispersed yet highly loaded slurry having such diverse phases, one or more dispersants are utilized to facilitate the dispersion; the dispersant also aids in overcoming certain particle-to-particle interactions within a single phase, such as decreasing the Van der Waals attractive forces and the electrical double layer repulsive forces. Dispersants are chosen empirically, by both the artisan of ordinary skill and the expert alike. Suitable dispersants include polyacrylic polyelectrolytes, such as those available from R. T. Vanderbilt Co., Inc. of Morwalk, CT, under the designations DARVAN C and DARVAN 821A (both described as polyelectrolytes of the ammonium salt type), those availabel from W. R. Grace & Co., Lexington, MA, under such designations as DAXAD 30 and DAXAD 32 (described respectively as a sodium and an ammonium salt of a carboxylated polyelectrolyte), those available from National Starch & Chem. Corp., Bridgewater, NJ, under such designations as NARLEX LD-42 and NARLEX LD-45 (described respectively as a sodium and an ammonium acrylate copolymer with propylene glycol), and those availabel from Witco Chem. Co., Perth Amboy, NJ, under such designations as EMCOL CC-55 (described as a cationic, polyoxypropylene methyl ethyl ammonium acetate). These and other families of dispersants are described in co-pending applications Ser. Nos. 856,803, filed 25 Apr. 1986, 045,684, filed 01 May 1987, and 242,726, filed 09 Sept. 1988, all of which are incorporated herein by reference.

Lastly, the slurry includes a vehicle, such as water or any organic or inorganic liquid that is chemically compatible with the matrix and dopant phases. Also, the choice of a dispersant will be influenced by the particular liquid medium used.

The slurry is formed by mixing the matrix phase components (sinterable ceramic and sintering aid), the dopant(s), vehicle, and dispersant, preferably in a staged order of addition, under high energy (e.g., in a high amplitude milling or mixing device). Thereafter, the slurry can be formed by conventional processes, such as casting or molding. A preferred method of forming the slurry into a desired shape is by a low pressure injection molding process with pressureless freezing and non-destructive sublimative drying, as described in co-pending U.S. patent application Ser. No. 270,248 filed this same date, and incorporated herein by reference.

It is not necessary to employ the methods of the aforementioned U.S. patent application Ser. No. 036,377; a slip including a lower solids loading is suitable provided that all of the components are very well dispersed. A preferred solids loading is 40–60 vol. %. However, in a more homogenous slip, the better the likelihood of obtaining a dense article upon sintering.

An alternative method for forming is by thermoplastic molding routes typical in the ceramics and metal powder arts. Accordingly, one such method is to disperse the matrix and whisker phases in a polymer melt, which can be subsequently injection molded. Another method is to disperse the phases in a polymerizable binder solution, such as described in co-pending U.S. patent application Ser. Nos. 034,099, filed 01 Apr. 1987, and 054,628, filed 25 May 1987, as well as the continuing application of each as filed on 23 Sept. 1988, all incorporated herein by reference. Briefly, those methods preferably include adding the solid phases (i.e., matrix, including the sintering aid, and whiskers) in a staged order of addition to a polymerizable binder solution, and preferably while mixing under high energy. The binder solution includes at least one monomeric species, a plasticizer, a diluent, and a dispersant. Upon reaching the desired solids loading, the composition can be formed, such as by casting or injection molding, after which polymerization of the monomers is initiated; the slurry can be injected under low pressures as described in co-pending U.S. patent application Ser. No. 034,100, also filed 01 Apr. 1987, and incorporated herein by reference.

Suitable binder systems preferably include, but are not limited to, those including polyolefins, such as polyethylene, polypropylene, ethylene-vinyl acetate (EVA; with, for example, 19% to 40% vinyl acetate), and those available under the designations OKERIN 1865Q (a ceramic casting wax available from Astor Wax Corp., Harrison, NY), HOECHST WAX S (a hard acid wax typically used as an emulsifier, wax hardener, or solvent, available from American Hoechst Corp., Somerville, NJ), A-C-430 (an EVA copolymer typically used as an adhesives, and similar A-C brand resins, available from Allied Corp., Morristown, NJ), NA 270 and NA 250 (low density polyethylene resins available from U.S.I. Chem. Co., Cincinnati, OH), ELVAX 40-W (high vinyl acetate resins typically used as adhesives, sealants, and coatings, available from E.I. DuPont de Nemours & Co., Wilmington, DE), PRIMACOR 5981, 5983, 5990, and 5991 (high melt index adhesive polymers available from Dow Chem. Co., Midland, MI), as well as conventional binders such as oleic acid, stearic acid, and the like, and mixtures thereof, and other polymers conventionally used in the art, such as polyacrylates (e.g., poly(methyl methacrylate)) and poly(vinyl butyral). Compounding of the solid components (matrix, sintering aid, whiskers) and the binder can be done by conventional methods. Similarly, binder burnout can be accomplished by conventional techniques, typically 0.5–1° C./hr. from room temperature to 300° C. and 5°/hr. up to 800° C.; the burnout atmosphere can be oxidizing (e.g., air), neutral, or reducing depending on the ceramic and binder compositions. Green densities of 60.4% T.D. have been achieved under the present invention. Sintering for polymeric binder systems was performed in air at a heating rate of 6° C./hr.

The formed green part is subsequently pressureless sintered. Sintering should be at a temperature of at least the eutectic temperature of the sintering aid and matrix material, and is preferably 30°–50° C. higher than the eutectic temperature; for the yttria-alumina system described in the examples below, the sintering temperature is preferably about 1760° C. ±10° C.

Higher densities are achieved as the sintering time is increased with the highest densities achieved at about 6 hours. However, there is only about a 2% density gain between 2 and 6 hours; the highest densities are achieved by sintering at the 1780° C. ±10° C. for the yttria-alumina system.

In addition, sintering at 1800° C. (for yttria-alumina) increases the densification rate, but concomitantly increases surface degradation. FIG. 1 depicts the degradation kinetics of a 10 vol. % WRA (whisker reinforced alumina) article sintered at 1770° C. for alumina matrix powders of different average particle sizes (CPS-1 powder available from the present assignee and having an average particle size of 0.1–0.3 micron, and AKP-30 powder available from Sumitomo Chem. Co. Ltd., Osaka, Japan, and having an average particle size of 0.3–0.5 micron); the abcissa is the thickness of the degradation layer. This figure clearly shows that particles having a small average size from a degradation layer more slowly and to a lesser extent than more conventional powders having larger average particle sizes. Also, as described in further detail below, the final densities are achieved more quickly with smaller sized particles. Moreover, another beneficial effect of using smaller sized particles is that, when properly fabricated, the final article will have fine, uniform grains, which is a microstructural aspect having an important effect on increasing the strength of the article. Accordingly, for this system, the sintering temperature is preferably less than 1800° C., at which temperature the degradation reaction among the whiskers, matrix, and sintering aid is readily apparent; the degratation is aggravated by sintering times of greater than two hours. Similarly, finer powders are also preferred.

Figure 2:
FIG. 2 is a TEM (transmission electron micrograph) showing a SiC whisker surrounded by a Y—Al—Si—O glass phase.

Upon sintering, the sintering aid not only facilitates densification by forming a liquid phase, but, for example, in the yttria-alumina system, a yttria-alumina-garnet (YAG) phase is formed. The yttria and alumina can form a Y—Al—O glass, which appears to transform into a YAG phase as temperature is increased near to but not above the 1760° C. eutectic temperature; also, due to residual silica on SiC whiskers, a Y—Al—Si—O glass can also form. The $Y_2O_3$—$Al_2O_3$ system forms a YAG phase between alumina matrix grains and it also forms a Y—Al—O glass, which can dissociate into alumina grains and residual glass after cooling. The ultimate alumina matrix grains appear to nucleate the dissociation of alumina grains from the Y—Al—O glass. The general microstructure of the present composites is shown in FIG. 2, which is a TEM (transmission electron micrograph) showing a SiC whisker surrounded by a Y—Al—Si—O glass phase. The final article has less than 5 vol. % glass; less than 2 vol. % glass can readily be achieved; these characteristics are not generally observed in pressureless sintered composites fabricated from conventional materials.

It will be appreciated that different matrix materials will require different sintering aids, and the various combinations of desireable sintering aids for a particular matrix composition is well-documented. As noted above, it is preferred to sinter at between the eutectic temperature of the sintering aid-matrix combination and from about 30° to 50° C. higher.

Sintering of WRA (whisker reinforced alumina) should be in an inert atmosphere, such as in a graphite-type, high temperature, vacuum furnace; the atmosphere can be helium. An exemplary sintering schedule for a slip cast article is: room temperature to 575° C. at 8° C./min; 575° to 800° at 5.4°/min; 800° to sintering temperature at 9°/min; and cooling to 800° at −40°/min. Generally, the schedule is about 5°–9° C./min. up to about 1600° C. and thereafter at about 2°–3° C./min. up to the sintering temperature, although specific temperatures are not believed to be of critical importance.

It is unexpected that the novel pressureless sintered whisker reinforced composites (WRCs) exhibit an excellent density without resort to a pressure-sintering step. More specifically, as described in the examples following, a 10 vol. % WRC can be fabricated according to the present invention to 98+% T.D., typically 99+% T.D., while the state of the art (e.g., the '413 patent to Tiegs) requires a pressure-sintering step to achieve the same densities. Further, in view of the same state of the art, which describes sintered densities of 75% T.D. for 20 vol. % whiskers, the present invention unexpectedly achieves densities of 93+% T.D. for the same whisker loading.

The microstructure of a 20 vol. % SiC WRA (93% T.D.) made according to the present invention is shown in FIG. 3.

The invention will be further illustrated by the following examples which are specific embodiments and thus not intended to be limiting.

EXAMPLE 1

A 10 vol. % SiC whisker reinforced composited was prepared by mixing 55 vol. % of a solids phase and 45 vol. % of a liquid phase. The solids phase included 8.1 wt. % SiC whiskers (as-received from Tateho Chemical), 82.7 wt. % alumina powder (CPS-1 as described above), and 9.2 wt. % yttria ($d_{avg}$=2.14 $\mu$m, used as-received from Research Chemical, Phoenix, AZ). The liquid phase included 91.7 wt. % deionized water and 8.3 wt. % of NARLEX LD-45 dispersant (as described above). The solid and liquid phases were mixed in a high energy mixer (GYROMIXER brand, available from Miller Paint Co., Toledo, OH) for 20–30 minutes. Thereafter, the mixture was tumbled for 16 hours. The resulting slurry was slip cast in the geometry of a disc having a 1" diameter and ¼" thickness; injection molding, tape casting, and other conventional techniques also can be used to form green articles via the present invention.

The cast parts were dried overnight. It is preferred to control drying to achieve the best green densities; a preferred slow drying rate is that drying should proceed at not more than one inch in thickness for every 24 hours and that drying should be unidirectional. For example, for the disc in this example, drying is affected by exposing only one disc surface.

Figure 3A:
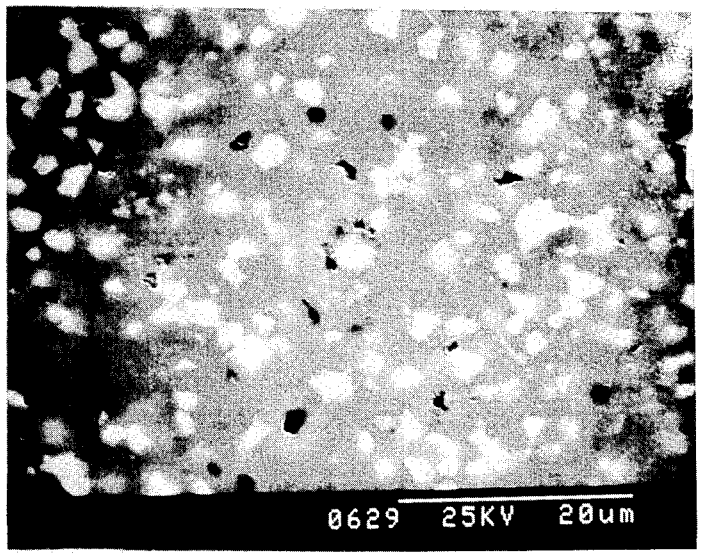
FIGS. 3a and 3b depict the respective microstructures of a 10 vol. % SiC-WRA (>99% T.D.) and a 20 vol. % SiC WRA (93% T.D.) made according to the present invention.

The dried parts were sintered in an inert (helium) atmosphere in a graphite high temperature furnace. Heating from room temperature was at about 9° C./min. up to about 1600° C. and thereafter at about 2° C./min. up to the sintering temperature of 1760° C. The sintered articles were cooled at a rate of −40° C./hour. A SEM of a polished surface of this article (sintered at 1760° C.) is shown in FIG. 3a.

EXAMPLE 2

The same procedure described in Example 1 was followed using the same materials except that AKP-30 brand alumina powder was substituted for the CPS-1 brand alumina powder.

EXAMPLE 3

The same procedure as described in Example 1 was followed using the same materials except that the whiskers were classified such that they had an aspect ratio of 6–15 and the yttria was classified to provide an average particle size of 0.68 $\mu$m.

EXAMPLE 4

The same procedure as described in Example 3 was followed using the same materials except that AKP-30 powder was substituted for the CPS-1 powder.

EXAMPLE 5

Figure 3B:
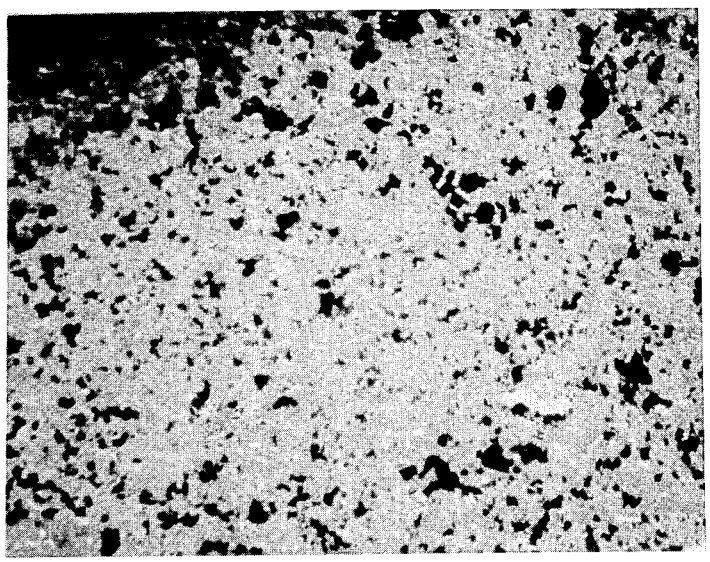

A 20 vol. % SiC whisker reinforced alumina article was produced by the same procedure as described in Example 1. The solids phase was present in the slurry at 42.7 vol. % and included: 74.6 wt. % CPS-1 alumina powder; 8.5 wt. % yttria (from Research Chemical, classified to $d_{avg}$=0.68 $\mu$m); and 16.9 wt. % SiC whiskers (as-received from ARCO as described above). The liquid phase of the slurry (57.3 vol. %) included 77.4 wt. % deionized water, 19.4 wt. % methanol, and 3.2 wt. % dispersant (NARLEX LD-45); the methanol was added to lower the viscosity of the slurry and was also found to aid in dispersion. The resulting article had a density of 93% T.D. and a SEM of a fracture surface is shown in FIG. 3b.

While all of these examples use deionized water, it should be noted that deionized or distilled water is not required and that ordinary tap water is suitable.

In summary, the Examples depict the following combinations:

| Example | Alumina | SiC Whiskers | Yttria |
| --- | --- | --- | --- |
| 1 | CPS-1 | Tateho, as-received | as-received |
| 2 | AKP-30 | Tateho, as-received | as-received |
| 3 | CPS-1 | Tateho, classified | classified |
| 4 | AKP-30 | Tateho, classified | classified |
| 5 | CPS-1 | ARCO, as-received | classified |

Figure 4A:
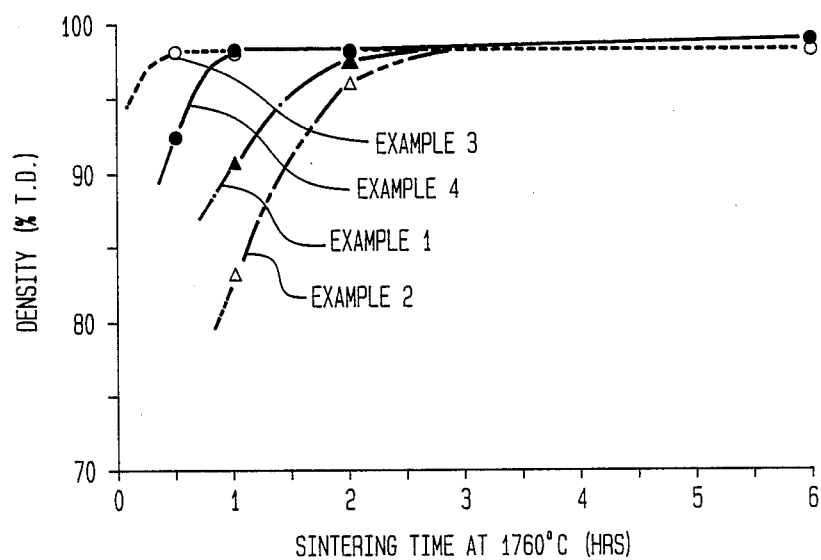
FIGS. 4a and 4b depict the theoretical densification as a function of sintering time for different alumina-SiC whisker compositions at, respectively, 1760° C. and 1790° C.
Figure 4B:
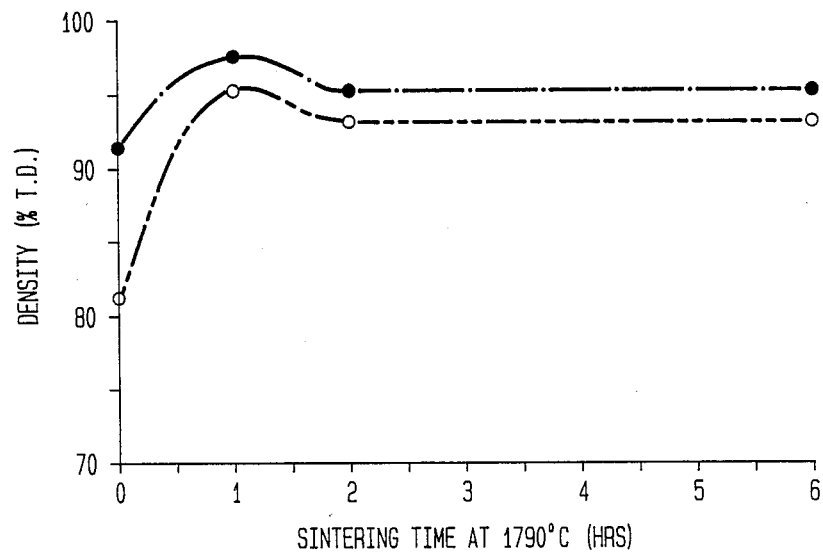

The results of the final densities achieved are depicted in FIGS. 4a and 4b; the green articles of Examples 1 and 2 were sintered at both 1760° C. and 1790° C., while those of Examples 3 and 4 were only sintered at the lower temperature. As seen in FIG. 4a, the slower densification rates were achieved for particles having larger average sizes (AKP-30 as larger than CPS-1). Further, classification of the sintering aid (yttria) to a smaller average particle size dramatically reduced the period until which the final density was achieved. In FIG. 4b, where the sintering temperature was 1790° C., a comparison with FIG. 4a shows that while densification occurs earlier (the article obviously starts sintering below the desired 1790° C. temperature), its maximum density is less than those sintered at the lower temperature; further, unlike the lower temperature sintering, there is a degradation whereby porosity increases such that the resulting density after about 2 hours of sintering is less than 95% T.D.

These results evidence the unexpectedly beneficial effects on densification of average particle size (and a narrow particle size distribution) in combination with a well-dispersed, homogeneous slurry. The benefits include a density high than observed for pressureless sintered articles and also in a more rapid period, a more uniform microstructure, and better as-fired surfaces (due in part to rapid densification).

The foregoing disclosure of specific embodiments is meant to illustrate the present invention and is not meant to be limiting. Various additions and modifications may become manifest to the skilled artisan upon reviewing this specification, which changes are meant to be within the scope and spirit of the present invention as defined by the following claims.

What is claimed is:

1. A process for fabricating a whisker reinforced composite having a density of at least 99% theoretical, comprising:
   (a) providing a slip including (i) solids composed of from 5 to 10 vol. % whiskers, 2–10 vol. % of a sintering aid, and a major portion of a pressureless sinterable matrix material having an average particle size of $\leq 0.5$ micron, (ii) a vehicle, and (iii) a dispersant;
   (b) forming the slip into a desired shape; and
   (c) densifying the shape by pressureless sintering at a temperature of not less than the eutectic temperature of the sintering aid and matrix material.

2. The process as defined in claim 1, wherein the whiskers are selected from the group consisting of tungsten carbide, silicon carbide, silicon nitride, alumina, silica, and mixtures thereof.

3. The process as defined in claim 1, wherein the matrix material is selected from the group consisting of alumina, mullite, zirconia, silicon nitride, and mixtures thereof.

4. The process as defined in claim 1, wherein the sintering aid is selected from the group consisting of yttria, lanthana, ceria, magnesia, and mixtures thereof.

5. The process as defined in claim 1, wherein the sintering aid has an average particle size of not greater than one micron.

6. A process for fabricating a whisker reinforced composite having a density of at least 93% theoretical, comprising:
   (a) providing a slip including (i) solids composed of from 5 to 20 vol. % whiskers, 2–10 vol. % of a sintering aid, and a major portion of a pressureless sinterable matrix material having an average particle size of $\leq 0.5$ micron, (ii) a vehicle, and (iii) a dispersant;
   (b) forming the slip into a desired shape; and
   (c) densifying the shape by pressureless sintering at a temperature of not less than the eutectic temperature of the sintering aid and the matrix material.

7. The process as defined in claim 6, wherein the whiskers are selected from the group consisting of tungsten carbide, silicon carbide, silicon nitride, alumina, silica, and mixtures thereof.

8. The process as defined in claim 6, wherein the matrix material is selected from the group consisting of alumina, mullite, zirconia, silicon nitride, and mixtures thereof.

9. The process as defined in claim 6, wherein the sintering aid is selected from the group consisting of yttria, lanthana, ceria, magnesia, and mixtures thereof.

10. A process for fabricating a whisker reinforced composite having a density of at least 99% theoretical, comprising:
    (a) providing a moldable composition including (i) solids composed of from 5 to 10 vol. % whiskers, 2–10 vol. % of a sintering aid, and a major portion of a pressureless sinterable matrix material having an average particle size of $\leq 0.5$ micron and (ii) a thermoplastic binder;
    (b) molding the composition into a desired shape; and
    (c) densifying the shaped composition by pressureless sintering at a temperature of not less than the eutectic temperature of the sintering aid and the matrix material.

11. The process as defined in claim 10, wherein the whiskers are selected from the group consisting of tungsten carbide, silicon carbide, silicon-nitride, alumina, silica, and mixtures thereof.

12. The process as defined in claim 10, wherein the matrix material is selected from the group consisting of alumina, mullite, zirconia, silicon nitride, and mixtures thereof.

13. The process as defined in claim 10, wherein the sintering aid is selected from the group consisting of yttria, lanthana, ceria, magnesia, and mixtures thereof.

14. The process as defined in claim 10, wherein the binder is polyethylene, polypropylene, ethylene-vinyl acetate, poly(methyl methacrylate), poly(vinyl butyral), or mixtures thereof.

15. The process as defined in claim 10, wherein the sintering aid has an average particle size of not greater than one micron.

16. A process for fabricating a whisker reinforced composite having a density of at least 93% theoretical, comprising:
    (a) providing a moldable composition including (i) solids composed of from 5 to 20 vol. % whiskers, 2–10 vol. % of a sintering aid, and a major portion of a pressureless sinterable matrix material having an average particle size of $\leq 0.5$ micron and (ii) a thermoplastic binder;
    (b) molding the composition into a desired shape; and
    (c) densifying the shaped composition by pressureless sintering at a temperature of not less than the eutectic temperature of the sintering aid and matrix material.

17. The process as defined in claim 16, wherein the whiskers are selected from the group consisting of tungsten carbide, silicon carbide, silicon nitride, alumina, silica, and mixtures thereof.

18. The process as defined in claim 16, wherein the matrix material is selected from the group consisting of alumina, mullite, zirconia, silicon nitride, and mixtures thereof.

19. The process as defined in claim 16, wherein the sintering aid is selected from the group consisting of yttria, lanthana, ceria, magnesia, and mixtures thereof.

20. The process as defined in claim 16, wherein the binder is polyethylene, polypropylene, ethylene-vinyl acetate, poly(methyl methacrylate), poly(vinyl butyral), or mixtures thereof.

* * * * *